(No Model.)

O. W. CHOAT.
TIRE TIGHTENER.

No. 413,296. Patented Oct. 22, 1889.

Witnesses
J. M. Withrow
Wm. Bagger

Inventor
Otis W. Choat.
By his Attorneys,
C. A. Snow & Co.

UNITED STATES PATENT OFFICE.

OTIS W. CHOAT, OF WILLOW SPRINGS, MISSOURI, ASSIGNOR OF ONE-HALF TO HENRY M. WACHORN AND WILLIAM E. DREW, OF SAME PLACE.

TIRE-TIGHTENER.

SPECIFICATION forming part of Letters Patent No. 413,296, dated October 22, 1889.

Application filed June 18, 1889. Serial No. 314,711. (No model.)

*To all whom it may concern:*

Be it known that I, OTIS W. CHOAT, a citizen of the United States, residing at Willow Springs, in the county of Howell and State of Missouri, have invented a new and useful Tire-Tightener, of which the following is a specification.

This invention relates to tire-tighteners; and it has for its object to provide a device which shall be simple in construction, durable, and efficient.

The invention consists in the improved construction of the devices to be attached to the meeting ends of the fellies of a vehicle-wheel, as will be hereinafter more fully described, and particularly pointed out in the claim.

Figure 1:
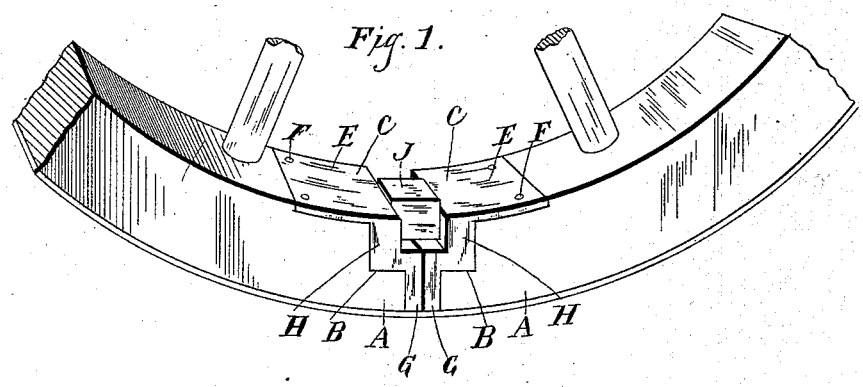
Figure 2:
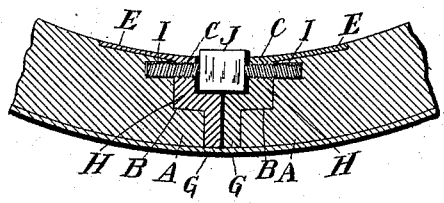
Figure 3:
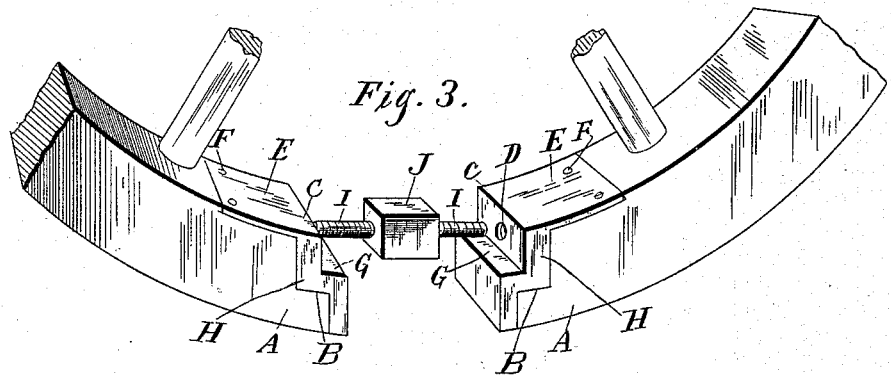

In the drawings, Figure 1 is a perspective view showing the meeting ends of two fellies equipped with my invention. Fig. 2 is a vertical sectional view of the same. Fig. 3 is a perspective view showing the parts constituting my invention separated or detached from each other.

The same letters refer to the same parts in all the figures.

The meeting ends of the fellies, which are designated by letters A A, are provided with recesses B B, formed in their under sides and forming seats for the plates C C, which are provided with screw-threaded perforations D D. The lower ends of the plates C C are provided with wings or flanges E E, extending laterally along the under sides of the fellies, and having perforations F to receive the screws or other devices by means of which they are attached to the said fellies. The upper ends of the plates C are provided with outwardly-extending offsets G, from the outer ends of which flanges H extend upwardly and fit against the end faces of the fellies, to which they may be suitably attached by means of screws or bolts. It will thus be seen that the flanges H H practically form the meeting ends of the fellies, and that the faces of the plates C C are normally held at some distance apart, thereby forming a recess for the reception of the operating-bolt.

The screw-threaded perforations D D in the plates C C are provided, respectively, with right and left hand threads, so as to receive the right and left hand threaded bolt I, which is provided with a centrally-located wrench-seat J, adapted to fit between the faces of the plates C C.

The operation of my invention will be readily understood from the foregoing description, taken in connection with the drawings hereto annexed. The meeting ends of the fellies are connected by means of a right and left hand threaded bolt, which is normally screwed up tight, so as to bring the meeting ends of the fellies closely together. When in the course of time the tire of the wheel becomes loose, the bolt is simply manipulated by means of an ordinary wrench in such a manner as to force the meeting ends of the fellies slightly apart, thereby expanding the rim of the wheel in the tire and tightening the latter. This operation may be repeated as often as may be necessary, and it will thus be seen that my invention provides a means whereby the tire may be constantly kept in good condition without necessity of its removal from the wheel.

My improved tire-tightening device is exceedingly simple in construction and may be applied at a trifling expense. It will be particularly observed that the meeting ends of the fellies, which are represented by the faces of the flanges H H, are normally close together, and will be gradually forced only a slight distance apart. At the same time the faces of the wrench-seat of the bolt I are fully exposed to the grip of a wrench by means of which the device is operated. It will thus be seen that the tread of the tire upon the rim of the wheel is practically not diminished, as it is always more or less liable to be in tire-tightening devices which provide for the forcing apart of the meeting ends of the fellies. The strength and durability of a wheel provided with my improvement are correspondingly increased. The combined thickness of the meeting flanges H H, being fully equal to the length of the wrench-seat I upon the right and left hand threaded bolt, admits of the faces of said meeting flanges coming closely together when the device is in its normal position.

Having thus described my invention, I claim and desire to secure by Letters Patent of the United States—

As an improvement in tire-tighteners, the combination, with the fellies having recesses B at their meeting ends, of the plates having right and left hand threaded perforations, said plates being provided with wings or flanges extending over and attached to the inner sides of the fellies, shoulders or offsets, and flanges extending from the ends of said offsets and constituting the meeting edges, and the right and left hand threaded bolt having a wrench-seat fitted between the said shoulders or offsets, substantially as and for the purpose set forth.

In testimony that I claim the foregoing as my own I have hereto affixed my signature in presence of two witnesses.

OTIS W. CHOAT.

Witnesses:
HENRY M. WATCHORN,
WILLIAM E. DREW.